Feb. 13, 1940.  E. BUGATTI  2,190,397
VEHICLE
Filed May 12, 1937  2 Sheets-Sheet 2
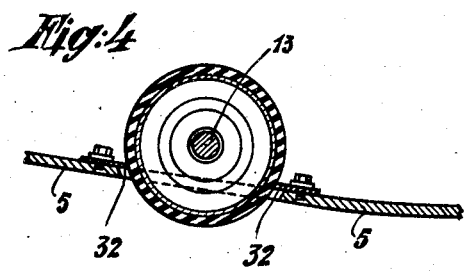
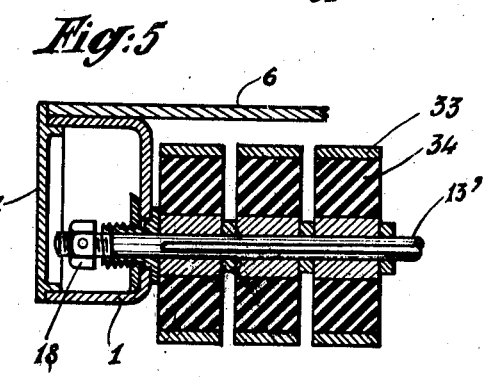
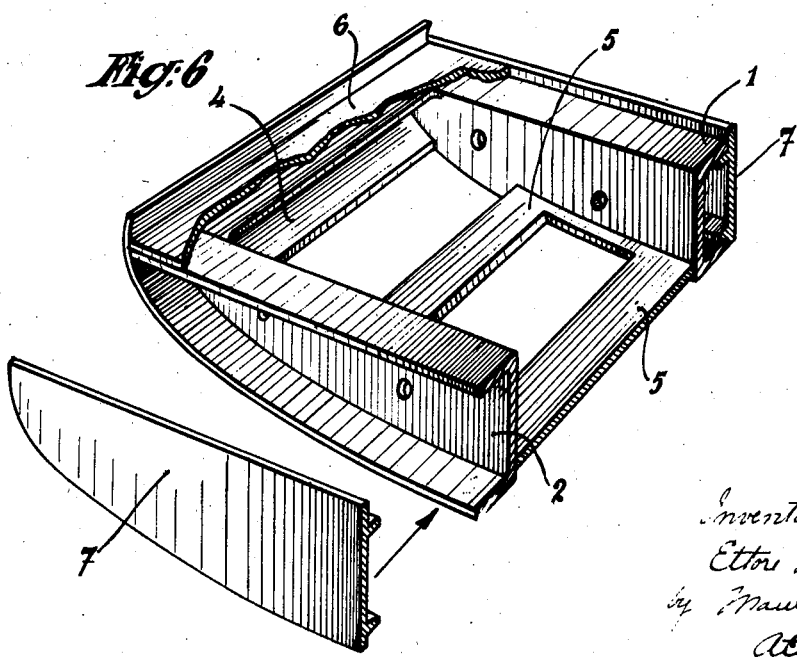

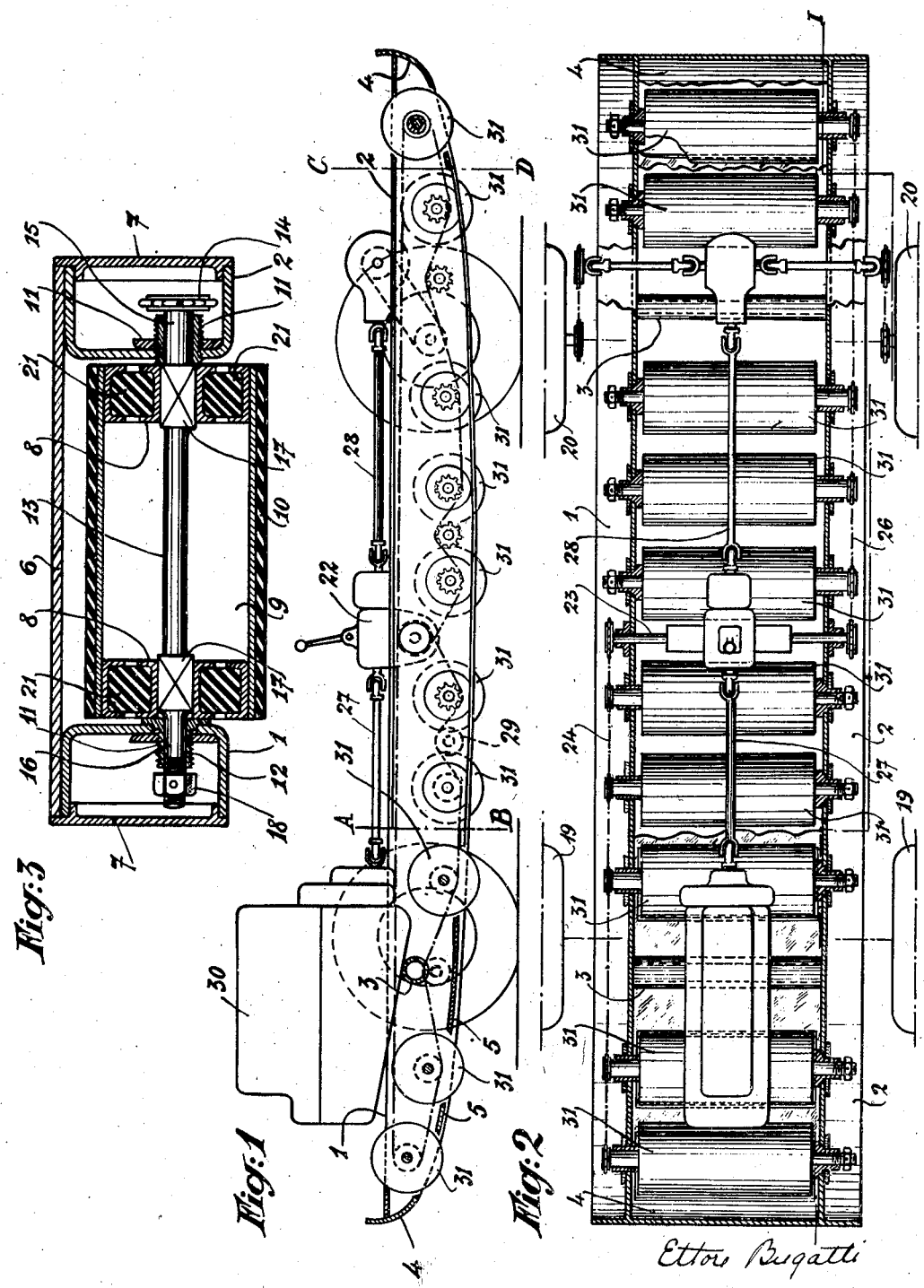

Patented Feb. 13, 1940

2,190,397

UNITED STATES PATENT OFFICE 2,190,397

VEHICLE

Ettore Bugatti, Molsheim, Bas-Rhin, France

Application May 12, 1937, Serial No. 142,272
In France May 13, 1936

11 Claims. (Cl. 180—1)

This invention relates to vehicles, and more particularly to vehicles adapted to travel over uneven or muddy ground as well as on the road or even and hard ground, of the kind in which auxiliary ground bearing surfaces, which are out of operation when the vehicle is moving over even and hard ground, are provided in association with normal ground bearing wheels.

It is an object of this invention to provide a vehicle of the aforesaid kind with particularly wide auxiliary ground bearing surfaces so as considerably to diminish the pressure on a muddy or like soft ground when the vehicle normal wheels have sunk as deeply as to enable operative engagement of such auxiliary surfaces with the ground.

Another object is to make provision whereby at least a part of the auxiliary surfaces is used as means for propelling or assisting in propelling the vehicle over muddy or like soft ground, said part being of the roller type so that the known inconveniences and liability to failure or breakage of caterpillars are avoided.

A further object is to provide vehicles of the aforesaid type with two kinds of auxiliary surfaces at different levels, so that only one of them or both may come into operative contact with the ground according to the condition of said ground.

Still further objects will be apparent as the description proceeds.

Preferred embodiments of the present invention will be hereinafter described with reference to the accompanying drawings, given merely by way of example, and in which:

Fig. 1 illustrates the chassis frame of a vehicle constructed in accordance with the invention, the view being a diagrammatic elevation partly in longitudinal section on the left-hand side of line A—B and the right-hand side of line CD, along line I—I on Fig. 2.

Fig. 2 is a corresponding plan view; the webs of the longitudinal side members and the bearings of the auxiliary rollers are shown in section; the bottom plate or belly has not been illustrated in that portion which corresponds approximately to the interval between lines AB and CD on Fig. 1.

Fig. 3 is a transverse sectional view of the side members of the chassis frame, an auxiliary roller with its bearings being shown in axial section.

Fig. 4 is a partial longitudinal section through one of the auxiliary rollers, showing scraping means associated with said roller.

Fig. 5 is a partial transverse section analogous to the left-hand side portion of Fig. 3 and showing a modification.

Fig. 6 shows in perspective view, with exploded parts, the front portion of the frame structure illustrated at a minor scale on Figs. 1 and 2.

The chassis-frame shown by Figs. 1 and 2 includes two side-members 1 and 2 of U-shaped section the webs being on the inside and the wings on the outside. These side members may be made of elements assembled in the manner well known in the art. The wings or flanges of the side members are sufficiently wide for protecting the bearings of the auxiliary rollers 31 and, possibly, the suspension elements of these bearings if the latter are movable with respect to the side members, especially if they are connected thereto through an elastic suspension (for instance, a known spring or pneumatic or hydraulic suspension, which may include load equalizers between the successive rollers in one or more groups of the auxiliary rollers, or between the auxiliary rollers and the normal ground bearing wheels 19, 20, as will be readily understood by any one skilled in the art).

The upper flange of each of the side members 1 and 2 is preferably straight. I may also take advantage of the fact that the web of the side members, for reasons of strength, must be higher in the middle than at the ends for giving the lower flange a convex shape which causes it to work in the manner of a shoe, substantially increasing the bearing area of the vehicle on the ground, when said ground is extremely soft.

The two side members 1 and 2 of the chassis frame are connected together and stiffened in the usual manner through cross members such as 3. The end cross members 4 advantageously have the shape of a transverse shield which facilitates crushing and levelling of the ground projections and merges into the ends of the side members so as to form, together with them, a unitary wide shoe. A belly 5, of thick sheet metal suitably stiffened, extends under the vehicle, being attached through its side edges to the webs of side members 1 and 2, as will be clearly apparent from Fig. 6; the belly 5 is arranged substantially to span the longitudinal interval between front and rear cross-members 4, but for simplifying the showing, only its front portion from its front edge to line AB and its rear portion from its rear edge to line CD have been illustrated on Figs. 1 and 2; its front portion is also visible on Fig. 6. The belly 5 plays the same role as cross member 4, i. e., forms an auxiliary ground bearing surface. The rollers or auxiliary wheels 31 project through suitable apertures in said belly. The edges of these apertures are preferably provided with scraping means 32 illustrated on Fig. 4 in connection with a roller other than the frontmost and rearmost ones, so that none of the cross-members 4 is visible, said scraping means 32 being adapted to prevent the inflow of mud into the inside of the chassis frame, where the rollers are journalled.

A floor 6, shown in transverse cross-section on Figs. 3 and 5 and partly broken away on Fig. 5 but not illustrated on Figs. 1 and 2 for simplification purpose, rests through both side edges upon the upper wings or flanges of the longitudinal side members 1 and 2, and separates the rollers from the inside of the body.

The suspension and transmission elements, housed in the space between the web and the flanges of the side members 1 and 2, are protected by easily removable lids 7 (Figs. 3 and 6) which also enable inspection, keeping up, repairing and replacing said elements.

While a drive may be imparted to the rollers from the power source on board of the vehicle via any suitable or convenient transmission means, including for instance gears, chains, Cardan shafts and so on, and while I may also use the transmission mechanism described in my U. S. Patent No. 2,107,689, February 8, 1938, it has been assumed, in the present illustration selected merely by way of example, that all the auxiliary rollers 31 were driving rollers and furthermore that each of them had a certain elasticity. With reference to Fig. 3, I will now describe an embodiment of such a roller. The rim 9, consisting for instance of a sheet iron cylinder, is surrounded with an envelope or tire 10 having a high grip, such as a covering provided with a plurality of projections and/or made of india rubber, and the rim is connected to two hubs 8 through elastic rings or the like 21. The spindle or axle 13 of the roller is journalled, at 15 and 16, in bearings 11 and 12 which, as above stated, may be either stationary or movable with respect to the side members 1 and 2. Axial side motions of spindle 13 are limited by the gear or sprocket wheel 14 and by a nut 18. The drive of the roller by spindle 13 which carries gear 14 is ensured through square-shaped parts or ribs at 17. Owing to the diameter given to bearing 11, it is possible to introduce spindle 13 into this bearing toward the left hand side of Fig. 3 and to remove it in the same manner, in the opposite direction.

In a modified form, which is illustrated by Fig. 5, a roller is made up of a series of coaxial wheels, generally denoted by reference 33, laid side by side and mounted upon a common driving spindle 13' (analogous to spindle 13 shown on Fig. 3), the wheels 33 having resilient hubs such as rubber discs 34.

It has been supposed, in the present description, that the torque supplied by engine 30 is transmitted through Cardan shafts to a gear box 22 and is then distributed from said gear box to the ordinary rear wheels 20 and the auxiliary rollers 31. For controlling and driving the wheels 20, I have shown a chain transmission. As for the auxiliary rollers, they are distributed into a front train or set collectively driven from a shaft 23 by a chain 24 which passes on pinions 14 of the front rollers and a rear train or set interconnected and collectively driven in a similar manner by a shaft 25 and a chain 26. The gear box is so devised that substantially the same peripheral speed is imparted to the rollers 31 and the wheels 19. Furthermore, the gear box may be arranged in such manner that it is possible at will to couple the shaft 27 from the engine with one or several of the shafts 23, 25 and 28, the latter being the shaft which controls the ordinary wheels 20. It is advantageous to make use of chain stretching devices such as 29 which increase the arc of meshing of pinions 14 with the corresponding pinions.

Preferably, wheels 20 and wheels 19 are independent suspension wheels.

Of course, the embodiment above described has been given merely as an example and many other embodiments of the invention are possible.

For instance, it is not necessary that the auxiliary rollers extend transversely over substantially the whole width of the vehicle, but it will be readily understood that the latter construction as well as the use of many auxiliary rollers distributed substantially over the whole length of the vehicle is beneficial in providing an auxiliary supporting surface of large area, which is helpful for propelling purposes.

Again, it is feasible to make use of known means, whereby the normal ground bearing wheels are partially or wholly relieved from the burden of supporting the vehicle load, the latter being partially or wholly transferred to the auxiliary rollers 31; such means may include a known hydraulic suspension for wheels 19 and 20, whereby the suspended mass of the vehicle may be lowered until it bears upon the ground through the auxiliary rollers 31.

Again, if the vehicle should travel on moist ground, for instance in very fluid mud or in water, the lower portion of the vehicle may be made water-tight.

It will be readily understood that the vehicle according to the present invention, which behaves on a road exactly as an ordinary vehicle, and which is capable of moving easily on a ground where ordinary vehicles could not move, is very advantageous for rural or colonial purposes, for military uses, and so on.

When the vehicle is used for military purposes and is to be armored, the rolling elements, i. e., the normal ground bearing wheels 19, 20 and the auxiliary rollers 31 may be protected by side plates and the suspension may be mounted inside the armored body; for instance the rolling elements may have an outer, bullet-proof solid disc forming with a strong rim a cup-shaped member adapted to protect more delicate elements such as elastic fittings, bearings, transmission gears, and so on.

What I claim is:

1. A vehicle which comprises a frame including side-members having wide, exposed lower surfaces adapted to form auxiliary ground bearing surfaces; normal ground bearing wheels revolubly mounted on the frame; a multiplicity of auxiliary ground bearing rollers revolubly mounted on the frame, having their operative surface in raised position with respect to the operative surface of the normal ground bearing wheels; and means supported by the frame for driving the rollers for propelling purposes.

2. In a vehicle having normal ground bearing surfaces which are movable for propelling the vehicle, an auxiliary ground bearing undercarriage arranged in raised position with respect to the said surfaces, which comprises an elongated rigid structure having a substantially flat, downwardly convex, rigid surface provided with spaced apart, transverse apertures; and a multiplicity of transverse rollers journalled in the rigid structure, each of which downwardly protrudes from the structure through one of the apertures.

3. In a vehicle having normal ground bearing surfaces which are movable for propelling the vehicle, an auxiliary ground bearing undercarriage arranged in raised position with respect to said surfaces, which comprises a rigid structure including a flat bottom with up-turned front and rear end portions, the bottom having spaced apart, transverse apertures for roller accommodation; a multiplicity of transverse rollers journalled in the structure, each of which downwardly projects from the structure through one of the apertures; and means supported by the rigid structure releasably coupled with the rollers for driving the same.

4. In a vehicle having normal ground bearing surfaces which are movable for propelling the vehicle, an auxiliary ground bearing undercarriage arranged in raised position with respect to said surfaces, which comprises two transversely spaced apart, longitudinal frame members of channel section; a plurality of transverse rollers each of which is journalled in the web of the frame members and downwardly projects with respect to the bottom flanges of said frame members; means for drivingly interconnecting the rollers, located within the channel of a frame member; and means supported by the frame members for imparting a drive to the interconnecting means.

5. A ground bearing undercarriage which comprises a rigid frame including two spaced apart, longitudinal hollow side-members; a plurality of transverse rollers extending between the side members, having side trunnions journalled in and projecting into the hollow space of the side-members; a gear rigid with the trunnion of each roller in one of the side-member; and an interconnecting chain operatively engaging each gear, located within said hollow side-member, for coupling the various rollers.

6. The combination of claim 4 wherein the flanges of each frame member outwardly project from the corresponding web, further comprising a removable lid for closing the outwardly open channel of each frame member.

7. A ground bearing undercarriage which comprises a rigid frame including two spaced-apart, longitudinal side-members; a plurality of transverse rollers having resilient peripheral surfaces, distributed substantially over the full length of the frame in close proximity to one another, each of which extends substantially from one side-member to the other, and downwardly projects below the bottom surface of the side-members; means for journalling each roller in the side-members; and means supported by the frame for collectively driving the transverse rollers.

8. In a vehicle having normal ground bearing surfaces which are movable for propelling the vehicle, an auxiliary ground bearing undercarriage having operative parts distributed at various levels above said surfaces for successive contact with the ground when the vehicle sinks therein, which undercarriage comprises a frame including transversely spaced longitudinal side-members provided with wide lower surfaces; an additional flat bottom surface rigid with the side-members, extending between the same in raised position with respect to the side-member lower surfaces, and having longitudinally spaced-apart transverse apertures; and a plurality of auxiliary rollers journalled in the side-members, each of which projects through one of the apertures down to a level lower than that of the side-member lower surfaces.

9. In a vehicle, a ground bearing undercarriage which comprises a frame including longitudinal side-members having a closed box formation; a plurality of closed revolving drums adapted to constitute ground bearing rollers, transversely extending between the side-members, journalled therein and arranged to protrude below the side-members; and a rigid, solid web spanning the space between the side-members, attached to the latter, and apertured in correspondence with the rollers so as to allow of said rollers passing therethrough.

10. The combination of claim 9, further comprising scraping means attached to the web, operatively engaging the rollers, for sealing the space between the rollers and the apertures.

11. The combination of claim 9, the box-like longitudinal side-members having outwardly disposed, removable lids, the combination further comprising roller interconnecting means wholly located within the side-members.

ETTORE BUGATTI.